United States Patent
Paek et al.

(10) Patent No.: US 6,704,573 B1
(45) Date of Patent: Mar. 9, 2004

(54) CHANNEL RESOURCE MANAGEMENT METHOD IN BASE STATION USING DYNAMIC FUNCTION IN MOBILE COMMUNICATION SYSTEM

(75) Inventors: Moon-Kee Paek, Seoul (KR); Seung-Hyun Min, Anyang-shi (KR); Song-Ho Kang, Ichon-shi (KR); Kyung-Rok Lee, Shiheung-shi (KR)

(73) Assignee: Hyundai Electronics Industries Co., LTD (KR)

( * ) Notice: Subject to any disclaimer, the term of this patent is extended or adjusted under 35 U.S.C. 154(b) by 0 days.

(21) Appl. No.: 09/526,946

(22) Filed: Mar. 16, 2000

(30) Foreign Application Priority Data

Mar. 16, 1999 (KR) .......................................... 1999-8774

(51) Int. Cl.[7] ................................................. H04Q 7/20
(52) U.S. Cl. .................... 455/452.1; 455/450; 455/511; 455/434
(58) Field of Search ................................. 455/511, 515, 455/434, 447, 464, 452, 453, 450, 452.1, 451, 509, 510, 512, 513, 514, 516, 452.2

(56) References Cited

U.S. PATENT DOCUMENTS

| | | | |
|---|---|---|---|
| 5,749,044 A | | 5/1998 | Natarajan et al. |
| 5,778,318 A | * | 7/1998 | Talarmo et al. ........... 455/452.1 |
| 6,047,187 A | * | 4/2000 | Haartsen ..................... 455/450 |
| 6,055,437 A | * | 4/2000 | Riley et al. ................. 455/511 |
| 6,064,889 A | * | 5/2000 | Fehnel ........................ 455/511 |
| 6,081,722 A | * | 6/2000 | DuQue-Anton et al. .... 455/452 |
| 6,157,839 A | * | 12/2000 | Cerwall et al. ............. 455/450 |
| 6,188,905 B1 | * | 2/2001 | Rudrapatna et al. ...... 455/452.2 |
| 6,226,520 B1 | * | 5/2001 | Jeoung ....................... 455/452 |
| 6,240,298 B1 | * | 5/2001 | Hayata ....................... 455/511 |
| 6,272,352 B1 | * | 8/2001 | Cerwall et al. ............. 455/511 |
| 6,278,877 B1 | * | 8/2001 | Brederveld et al. ......... 455/434 |
| 6,405,045 B1 | * | 6/2002 | Choi et al. .................. 455/453 |

* cited by examiner

*Primary Examiner*—Erika Gary
(74) *Attorney, Agent, or Firm*—R. Neil Sudol; Henry Coleman; William Sapone

(57) ABSTRACT

Disclosed is a channel resource management method in a base station using a dynamic function in a mobile communication system, in which a real-time conversion of a traffic channel to an overhead channel using a dynamic function is allowed when a trouble occurs in the overhead channel of a base station of a mobile communication system adopting code division multiple access(CDMA) system like digital cellular system(DCS) or personal communication system (PCS), and normal servicing of terminal can be maintained by a minimum channel resource conversion resulted from an effective management of channel resource. The traffic channel that is not currently used is converted in real-time to an overhead channel using the dynamic function when a trouble or an error occurs at the overhead channel of the base station, and the overhead channel is converted again to a traffic channel when the overhead channel for which a trouble or an error occurred is restored to normal, thus a terminal may perform a normal communication service by a minimum channel resource conversion resulted from an effective management of the channel resource.

4 Claims, 2 Drawing Sheets

CHANNEL RESOURCE MANAGEMENT METHOD IN BASE STATION USING DYNAMIC FUNCTION IN MOBILE COMMUNICATION SYSTEM

BACKGROUND OF THE INVENTION

1. Field of the Invention

The present invention relates to a channel resource management method in a base station using a dynamic function in a mobile communication system, in which a real-time conversion of a traffic channel to an overhead channel using a dynamic function is allowed when a trouble occurs in the overhead channel of a base station of a mobile communication system adopting code division multiple access (CDMA) system like digital cellular system(DCS) or personal communication system (PCS), and normal servicing of terminal can be maintained by a minimum channel resource conversion resulted from an effective management of channel resource.

2. Description of the Related Art

In general, as shown in FIG. 1, a mobile communications system, for example, DCS or PCS, includes a terminal 10, a base station 20 for performing wireless transmission/receipt of data to/from the terminal 10, a control station 30 for performing wireless transmission/receipt of data to/from the base station 20, and an exchanger station 40. A basic call processing and handoff between the base station 20 and the terminal 10 are performed by operating components of the base station 20, thus maintaining a smooth communication service of the terminal 10.

That is, the base station 20 and the terminal 10 communicate with each other using various types of channel resources, maintaining a communication service of the terminal 10.

The above-mentioned channel resource includes a pilot channel, synchronous channel, paging channel, access channel, and a traffic channel. The pilot channel, synchronous channel, and the paging channel together are referred to as an overhead channel. The terminal receives the channel resource transmitted from the base station, so that the system of the terminal can be initialized and the communication service may be maintained.

The pilot channel of the overhead channel is a reference channel to assist the terminal in system acquisition, base station recognition, and timing. The pilot channel is for discriminating sectors or cells, the synchronous channel is for synchronizing an initial time between the terminal and the base station, and the paging channel is for use of the terminal which processes the data of the base station, i.e., frequency, system data, neighbor system data, and access related data. The paging channel allows a mutual communication between the base station and the terminal, and the access channel involves in a reverse direction signal processing.

The pilot channel and the synchronous channel serve to maintain the communication service state of the terminal in a cell or a cell area. Here, the mobile communication system allows an allocation of only a single channel resource. Accordingly, the channel resource corresponding to each code from among 64 channel resources is allocated, so that the substantial dividing of each channel can be achieved.

That is, the pilot channel which is allocated with the channel resource corresponding to number 0 functions as a reference for discriminating each sector or cell, while the synchronous channel which is allocated with the channel resource corresponding to number 32 functions to synchronize an initial time between the terminal and the base station.

The paging channel uses channel resources of number 1 to number 7 from among 64 channel resources of a single sector or cell. Thus, the paging channel may use up to seven channel resources in maximum. However, the paging channel usually uses a single channel resource, and performs a service on the base station data and the call data of the terminal.

Meanwhile, when any trouble or error occurs in a channel among the overhead channel, the terminal may not recognize the base station. If such is a case, an initialization is required and communication service state of the terminal may not be normally maintained even after the terminal recognizes the base station.

In a conventional active/standby system a certain traffic channel is preset as a standby overhead channel. When an active overhead channel may not operate normally, the preset standby overhead channel, i.e., a traffic channel, may serve as an active overhead channel.

That is, a certain traffic channel is preset as a standby overhead channel, and an active overhead channel is periodically checked. Then, if the active overhead channel abnormally operates, the base station uses the preset standby overhead channel, i.e., a traffic channel, as an active overhead channel, so that a communication service can be maintained in the terminal.

However, such a conventional active/standby system is disadvantageous in that the number of traffic channels is decreased since the channel to be used as a traffic channel is used as a standby overhead channel. In the dual system of active/standby channel, the two channels periodically check each other so as to determine whether each channel operates normally, thus causing an overload.

Further, the traffic channel is initialized prior to being preset as a standby overhead channel. Therefore, a terminal of the corresponding base station may not temporarily perform a service, and channels which have been already connected may all be cancelled.

SUMMARY OF THE INVENTION

Therefore, it is an object of the present invention to provide a channel resource management method in a base station using a dynamic function in a mobile communication system adopting CDMA system like DCS or PCS, in which a traffic channel that is not currently used is converted in real-time to an overhead channel using the dynamic function when a trouble or an error occurs at the overhead channel of the base station, and the overhead channel is converted again to a traffic channel when the overhead channel for which a trouble or an error occurred is restored to normal, thus a terminal may perform a normal communication service by a minimum channel resource conversion resulted from an effective management of the channel resource.

To accomplish the above object of the present invention, there is provided a channel resource management method in a base station using a dynamic function in a mobile communication system, the method including: a first step of generating a database for channel management per frequency or sector, initializing each state information and data after the base station of the mobile communication system is initialized, and determining whether any trouble occurs at an overhead channel by periodically checking an overhead channel state; a second step of performing a real-time detection onto an occurrence of trouble at the overhead channel if it is determined that a trouble has occurred in the overhead channel in the first step, and setting up a traffic channel which is not currently used by managing the database; a third step of maintaining normal operation of communication service of a terminal by converting a traffic channel to a dynamic overhead channel without initializing the traffic channel set in the second step.

To accomplish the above object of the present invention, there is provided a channel resource management method in a base station using a dynamic function in a mobile communication system, the method including: a first step of generating a database for channel management per frequency or sector, initializing each state information and data after the base station of the mobile communication system is initialized, and determining whether any trouble occurs at an overhead channel by periodically checking an overhead channel state; a second step of determining whether an overhead channel where a previous trouble has occurred operates normally if it is determined that a trouble has not occurred in the first step; a third step of detecting a dynamic overhead channel currently performing a service by managing the database if it is determined that the overhead channel where the previous trouble has occurred operates normally in the second step; and a fourth step of operating as a traffic channel the dynamic overhead channel detected in the third step by changing only a state thereof without initialization and maintaining normally a communication service of a terminal.

To accomplish the above object of the present invention, there is provided a channel resource management method in a base station using a dynamic function in a mobile communication system, the method including: a first step of generating a database for channel management per frequency or sector, initializing each state information and data after the base station of the mobile communication system is initialized, and determining whether any trouble occurs in an overhead channel by periodically checking an overhead channel state; a second step of detecting in real-time an occurrence of trouble of the overhead channel if it is determined that a trouble has occurred in the overhead channel in the first step, and setting up a traffic channel which is not currently used by managing the database; a third step of operating as a dynamic overhead channel the traffic channel set up in the second step by changing only a state thereof without initialization and maintaining normally a communication service of a terminal; a fourth step of determining whether an overhead channel, where trouble has occurred previously, operates normally if it is determined that a trouble has not occurred in the first step; a fifth step of detecting a dynamic overhead channel currently performing a service by managing a database if it is determined that the overhead channels where the previous trouble has occurred, operates normally in the fourth step; and a sixth step of operating as a traffic channel the dynamic overhead channel detected in the fifth step by changing only a state thereof without initialization and maintaining normally a communication service of a terminal.

BRIEF DESCRIPTION OF THE DRAWINGS

The present invention will become more fully understood from the detailed description given hereinafter accompanying drawings, which are given by way of illustration only, and thus are not limitative of the present invention, and wherein.

PREFERRED EMBODIMENTS OF THE
PRESENT INVENTION

The present invention will be explained in more detail with reference to the attached drawings.

The dynamic function as referred to the present invention is a method where a channel is changed in real-time without affecting a terminal which is currently used, by changing a traffic channel which is not currently used to an overhead channel, if the overhead channel may not normally operate due to a trouble occurred thereto.

The present invention uses such a dynamic function so that a terminal may provide a service even when an overhead channel operates abnormally.

In addition, state information, type, and other data for each channel are stored in a database so as to effectively manage channels. In case where a normal overhead channel and a traffic channel which is changed to an overhead channel, i.e., a dynamic overhead channel, are all performing service or operating abnormally, such an abnormal operation is periodically checked so as to allow a normal operation of the overhead channel.

That is, a temporary database is generated for a separate management of a normal channel and a dynamic overhead channel. Such a temporary database is generated whenever any trouble occurs in the overhead channel, so that the normal overhead channel and dynamic overhead channel may not simultaneously operate since the channel change is managed via two buffers.

In the present invention, the following operation is performed for a further effective dynamic function.

If any trouble occurs in an overhead channel, a traffic channel is allocated to the overhead channel by a minimum time period, thus allowing a channel change during the continuation of existing service.

If any trouble occurs in an overhead channel, the number of overhead channels per channel card is calculated and a dynamic overhead channel is allocated to a channel card having the least overhead channels. Thus, the overhead channel having more loads than the traffic channel is evenly allocated to a single channel card.

If the overhead channel where a trouble has occurred returns to a normal operation, the traffic channel which has been used as an overhead channel may be changed to the original traffic channel, so that a minimum channel resource change can be obtained and the traffic channel can be effectively used.

Figure 1:
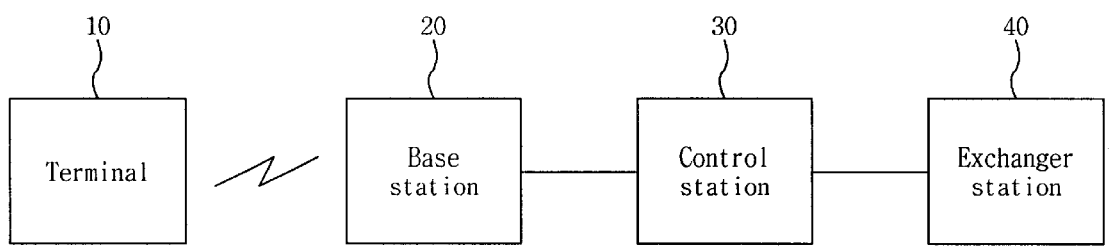
FIG. 1 is a block diagram of a conventional mobile communication system.
Figure 2:
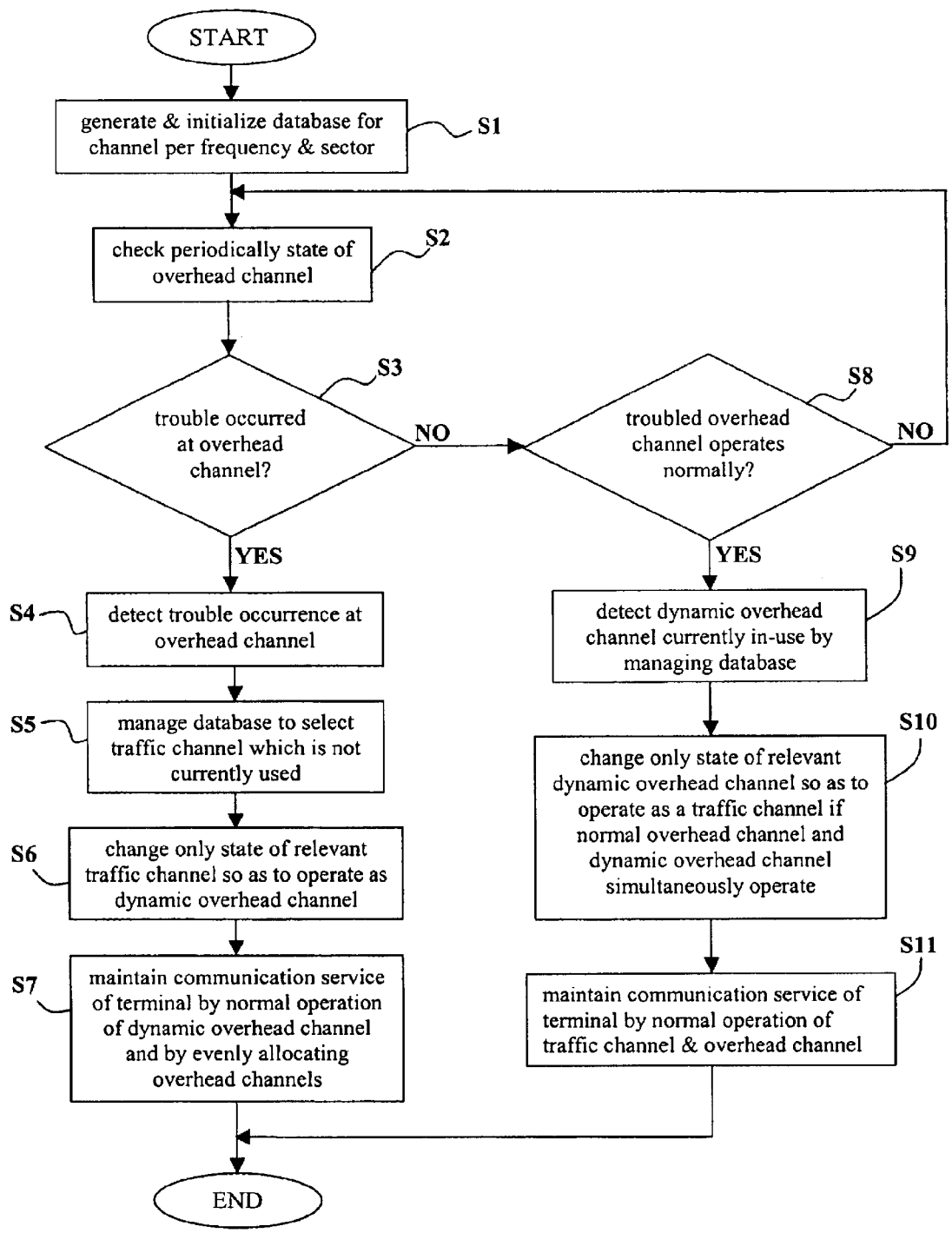
FIG. 2 is a flowchart illustrating a channel resource management method in a base station using a dynamic function in a mobile communication system according to the present invention.

Such a channel resource management method in a base station using a dynamic function in a mobile communication system can be explained with reference to FIG. 2.

Base station of a mobile communication system generates a database for use of channel management for each frequency or sector, and each state information and data are initialized in step S1.

Then, overhead channel state is periodically checked in step S2 so as to determine whether a trouble has occurred in the overhead channel in step S3.

If any trouble has occurred in the overhead channel in the step S3, the base station detects in real-time the occurrence of trouble via a hardware alarm and software alarm in step S4.

Then, if the overhead channel does not operate normally due to the occurrence of trouble, the base station sets up a traffic channel which is not currently used by managing the database in step S5, and immediately operates the traffic channel as a dynamic overhead channel by means of changing a state of the traffic channel without initializing the same in step S6.

At this time, number of overhead channels per channel card is calculated, so that the traffic channel of the channel card having the least overhead channel is changed to a dynamic overhead channel. Thus, overhead channels can be evenly allocated for each channel card.

Thus, the dynamic overhead channel normally operates in the step S6 so as to maintain a communication service of a terminal in step S7.

When a trouble has occurred in the overhead channel, the base station detects in real-time the trouble and sets up a traffic channel which is not in use. Then, without initializing the set-up traffic channel, only the state of the traffic channel is converted to a dynamic overhead channel, thus allowing a service in a dynamic overhead channel within at least 3 seconds.

In the meantime, if a trouble has not occurred in the overhead channel in the step S3, it is determined whether the overhead channels where a trouble has previously occurred, returns to normal or not in step S8.

That is, if the overhead channel where a trouble has previously occurred returns to normal in the step S8, the base station detects by managing the database the dynamic overhead channel which is currently performing a service in step S9. Thus-detected dynamic overhead channel operates as a traffic channel only by changing the state thereof without an initialization in step S10.

Thus, the traffic channel, which was changed from being a dynamic overhead channel in the step S10, and the overhead channel return to a normal operation, maintaining communication service of a terminal in step S11.

If the overhead channel operates normally, the base station detects a dynamic overhead channel which is currently performing a service and changes only a state thereof to a traffic channel without initializing the dynamic overhead channel, thus allowing a service in a traffic channel within at least 3 seconds.

In the present invention, to detect any abnormal operation of an overhead channel caused by an abnormal operation of a base station, or to prevent simultaneous operation of two overhead channels, say, a normal overhead channel and a dynamic overhead channel, the base station periodically checks the relevant database and channel state. If the base station fails to detect such an abnormal operation of the overhead channel, a dynamic function is performed. If the two overhead channels simultaneously operate, the dynamic overhead channel is converted to a traffic channel to provide a communication service.

In case where an operator does not intend to provide a service with respect to a sector or frequency, the base station checks an activation or deactivation of the relevant service. The above-mentioned dynamic function may not be performed if the sector or frequency is deactivated even when the overhead channel is abnormal.

That is, the database of the overhead channel is periodically checked, so that the overhead channel may return to a normal operation. If an operator does not intend to operate the overhead channel, each overhead channel is checked so as to perform a dynamic function.

In the present invention, the dynamic overhead channel is located in different sectors, and the terminal maintains a service even when an error occurs at sectors. If an error has occurred in two sectors from among three, the dynamic overhead channel is located in the remaining one sector, thus maintaining service of the terminal.

As described above, the present invention is advantageous in that all traffic channels are used as a communication channel if an overhead channel in a base station is normal, and one of traffic channels not in use is converted to a dynamic overhead channel so as to maintain a service of a terminal if an overhead channel is abnormal. If the overhead channel returns to a normal operation, the previous dynamic overhead channel is converted to a traffic channel, so that the terminal may maintain normal service state when the overhead channel abnormally operates.

Differently from a conventional active/standby method, the present invention does not use a standby overhead channel, thus eliminating wastage of channels and overload. When the overhead channel is converted to a traffic channel or vice versa, only a state thereof is converted without initializing the relevant channel. As a result, communication service of a terminal may maintained at a normal state.

Further, channel state is periodically checked using a database corresponding to each channel, so that the overhead channel can be managed in accordance with an operator's request.

What is claimed is:

1. A channel resource management method in a base station using a dynamic function in a mobile communication system said method comprising:

a first step of generating a database for channel management per frequency or sector, initializing each state information and data after said base station of the mobile communication system is initialized, and determining whether any trouble occurs in an overhead channel by periodically checking an overhead channel state, wherein said database operates in such a manner that an overhead channel is divided into a normal overhead channel and a dynamic overhead channel, information for channel state and channel type is stored in said database, temporary data are created whenever any trouble occurs in said overhead channel, a change in channel type is managed via two buffers, and an abnormal channel operation or a simultaneous operation of said overhead channel and dynamic overhead channel is checked so as to obtain a normal operation of said overhead channel;

a second step of selecting a traffic channel which is not currently used by managing said database if it is determined that trouble has occurred in said overhead channel in said first step; and a third step of maintaining normal operation of communication service of a terminal by converting said traffic channel selected in said second step to a dynamic overhead channel without initializing said traffic channel selected in said second step.

2. A channel resource management method in a base station using a dynamic function in a mobile communication system according to claim 1, wherein said database and channel state are periodically checked, a dynamic function is performed if an abnormal operation of said overhead channel is not detected, and said dynamic overhead channel is converted to a traffic channel if said normal overhead channel and dynamic overhead channel simultaneously operate, thereby preventing a failure of detecting an abnormal operation of said overhead channel caused by an abnormal operation of said base station or a simultaneous operation of said normal overhead channel and dynamic overhead channel.

3. A channel resource management method in a base station using a dynamic function in a mobile communication system, said base station having a plurality of channel cards, said method comprising:

- a first step of generating a database for channel management per frequency or sector, initializing each state information and data after said base station of the mobile communication system is initialized, and determining whether any trouble occurs in an overhead channel by periodically checking an overhead channel state;
- a second step of selecting a traffic channel which is not currently used by managing said database if it is determined that trouble has occurred in said overhead channel in said first step; and
- a third step of maintaining normal operation of communication service of a terminal by converting said traffic channel selected in said second step to a dynamic overhead channel without initializing said traffic channel selected in said second step, and evenly allocating at least one dynamic overhead channel to each channel card in such a manner that the number of overhead channels for each channel card is calculated and a traffic channel of a channel card having the least overhead channels is converted to a dynamic overhead channel.

4. A channel resource management method in a base station using a dynamic function in a mobile communication system according to claim 3, wherein said database and channel state are periodically checked, a dynamic function is performed if an abnormal operation of said overhead channel is not detected, and said dynamic overhead channel is converted to a traffic channel if said normal overhead channel and dynamic overhead channel simultaneously operate, thereby preventing a failure of detecting an abnormal operation of said overhead channel caused by an abnormal operation of said base station or a simultaneous operation of said normal overhead channel and dynamic overhead channel.

* * * * *